March 11, 1958  C. CAMPBELL  2,826,081
VIBRATING MECHANISM
Filed Jan. 26, 1955  2 Sheets-Sheet 1
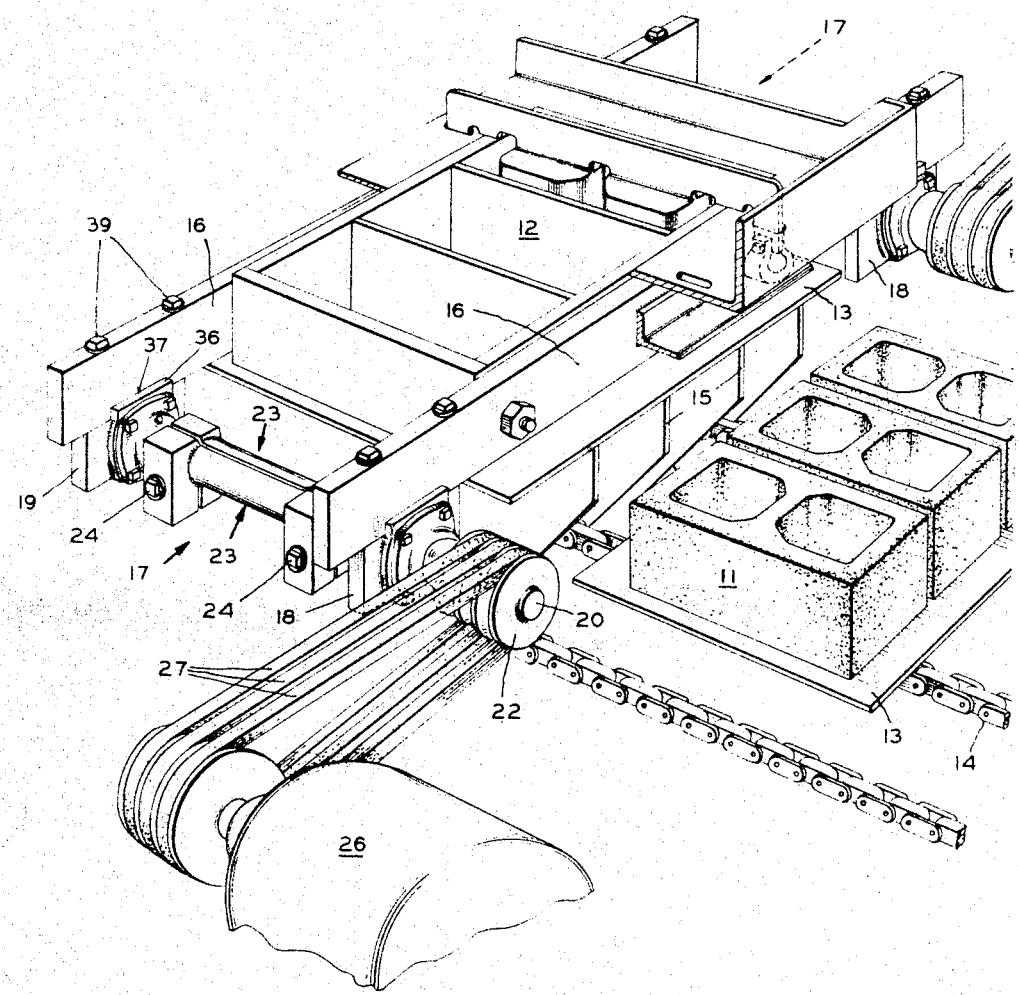
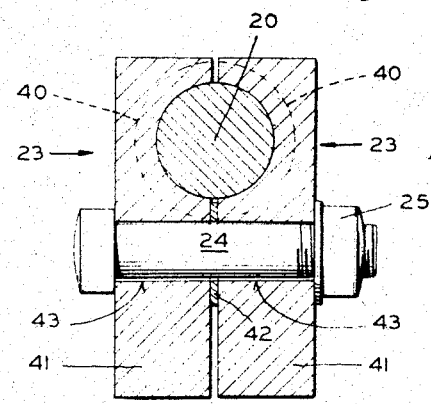
INVENTOR
Colin Campbell
BY
Cameron, Kerkam & Sutton
ATTORNEYS March 11, 1958  C. CAMPBELL  2,826,081
VIBRATING MECHANISM
Filed Jan. 26, 1955  2 Sheets-Sheet 2
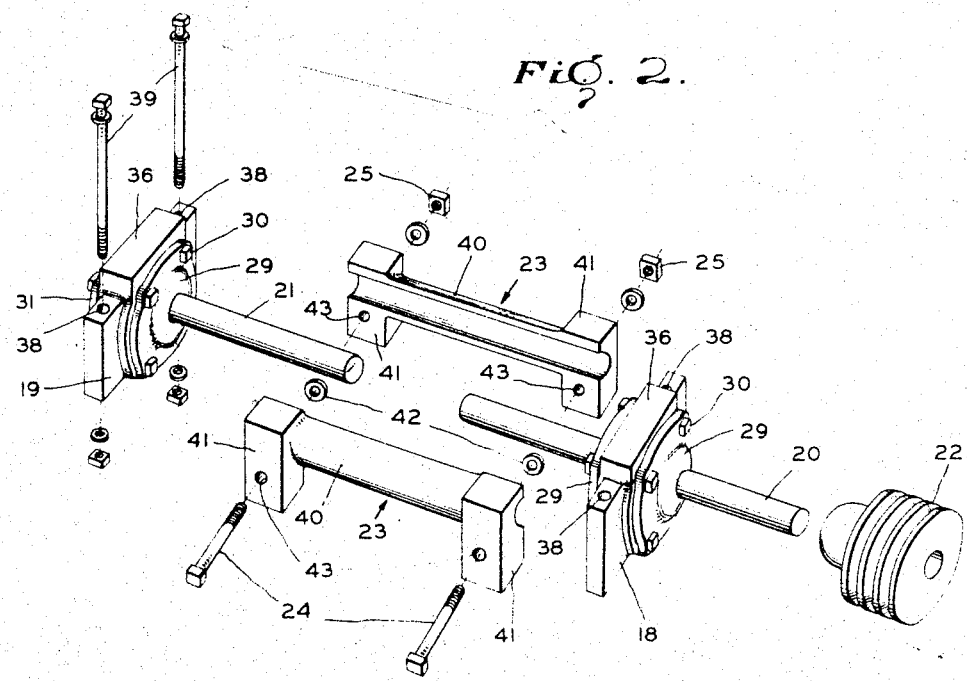
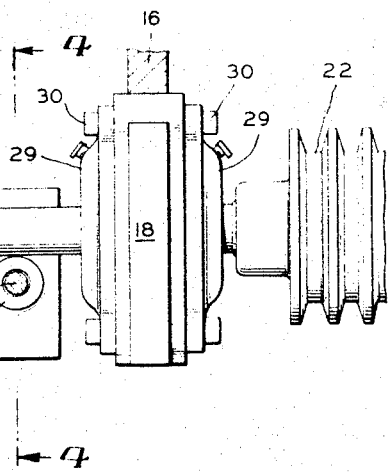
INVENTOR
*Colin Campbell*
BY *Cameron, Kirkam & Sutton*
ATTORNEYS United States Patent Office 2,826,081
Patented Mar. 11, 1958

2,826,081

VIBRATING MECHANISM

Colin Campbell, Hyattsville, Md., assignor to The Washington Brick Co., Muirkirk, Md., a corporation of Maryland Application January 26, 1955, Serial No. 484,094

6 Claims. (Cl. 74—61)

This invention relates to vibrating mechanisms of the type embodying eccentric weights mounted on rotatable shafts, and has particular application to devices for vibrating the mold boxes or other elements of machines for molding masonry blocks of concrete, slag, cinder and similar materials.

Inasmuch as the present invention is especially well adapted for use in automatic block molding machines of the character illustrated in Zevely Patents Nos. 2,566,787 and 2,689,950, the following disclosure will be directed primarily to an embodiment of the inventive concept which is particularly designed for incorporation in this type of machine. By so doing, however, it is not intended to limit the scope of the invention either to block molding machines in general, or to the specific kind of block molding machine shown in said patents, because it will be obvious that the invention has utility in various other applications.

In block molding machines of the construction represented in the above-mentioned Zevely patents, the conventional mechanism for vibrating the mold box comprises a pair of vibrator assemblies removably connected to the transversely extending side bars of the mold adjacent the ends thereof, each assembly consisting of front and rear bearing members bolted to the mold bars, a shaft journaled in said bearings, a belt driven sheave fixed to the front end of the shaft forward of the front bearing, and two or more eccentric weights detachably mounted on the shaft between the bearings. Vibrator assemblies of this character are difficult to install, adjust and maintain, require frequent and time-consuming repairs, and are of limited utility in that the same assembly cannot be used on mold boxes of different sizes. Even on different molds of the same standard size which vary slightly in dimensions, interchangeability of conventional vibrators is not possible without partial disassembly and adjustment of the parts.

The difficulties experienced with the conventional form of vibrator assembly used in block molding machines are several and well known. For example, when the shaft breaks or it becomes necessary to replace a front bearing, which are relatively frequent occurrences, the entire assembly must be removed from the mold box and disassembled in order to replace the damaged part. This not only involves excessive labor to effect the repairs, but also results in an undesirable loss of production time for the machine. Another difficulty arises from the fact that the individually mounted eccentric weights of such vibrators often change their relative positions on the shaft during operation and slip out of axial alignment, causing uneven or reduced vibration effects on the mold box. When this occurs, it is necessary to stop the machine and readjust the weights with a consequent loss of time and increase of maintenance expense. It is also necessary to completely remove vibrator assemblies of conventional construction whenever repairing or replacing any part of the mold box because, when mounted, the vibrator assemblies tie the mold side bars together at their ends and prevent disassembly of the mold. Inasmuch as mold boxes of the same standard size are seldom exactly alike in dimensions, particularly after they have been in use for any substantial length of time, the use of vibrator mechanisms of the type heretofore known necessitates either the stocking of a number of vibrator assemblies for each mold box which are not usable on other boxes, or the stocking of incomplete assemblies or parts which must be made up to fit the individual mold boxes when repair or replacement is required. A further disadvantage is that the vibrator assemblies of the prior art are not interchangeable between mold boxes of different standard widths.

The principal object of the present invention is to avoid such difficulties as those above indicated by providing a vibrating mechanism of new and improved construction which is especially well adapted for use in automatic block molding machines and which will materially reduce installation and maintenance costs, and assure more positive and reliable operation than the devices heretofore used for the same purpose.

Another object is to provide a novel vibrator assembly of the eccentric weight type which is readily adjustable to installations requiring different spacings between the shaft bearings, and wherein it is impossible for the eccentric weights to change their relative positions during operation.

A further object is to provide an improved vibrating mechanism of the character described wherein repairs may be made and parts replaced without complete removal of the vibrator assembly from the mold box or other body to which it is connected.

Still another object is to provide an improved form of vibrating unit for block molding machines which is so constructed that it may be readily installed and adjusted without subjecting the parts to stresses which are apt to produce premature failure during operation.

These and other objects will appear more fully upon consideration of the detailed description of the embodiment of the invention which follows. In this connection, it is to be expressly understood that the specific form of mechanism described and shown in the accompanying drawings is illustrative only and is not to be construed as representing the full scope of the invention, for which latter purpose reference should be had to the appended claims.

Referring now to the drawings, wherein like reference characters indicate like parts throughout the several views:

Fig. 1 is a perspective view of the mold box and certain associated parts of a well-known type of automatic block molding machine incorporating one form of vibrating mechanism embodying the present invention, some portions of the mold box being broken away and other portions omitted in the interest of clarity;

Fig. 2 is an exploded perspective view of one of the vibrator assemblies of the mechanism shown in Fig. 1;

Fig. 3 is a sectional view, with certain parts shown in full, taken substantially on a vertical plane through the axis of rotation of one of the vibrator assemblies of Fig. 1; and Fig. 4 is a vertical sectional view taken substantially on line 4—4 in Fig. 3.

The mold box and associated elements illustrated in Fig. 1 are, except for the improved vibrating means of the present invention, similar to the corresponding mechanism shown in the previously mentioned Zevely Patents Nos. 2,566,787 and 2,686,950, and are adapted for use in the well-known Besser type of automatic block molding machine wherein masonry blocks of various forms may be made on plain or imperforate pallets.

In such a machine, the blocks 11 are molded in a mold box 12 which is stationary except for the movements incident to vibration of the mold during the block forming operations, the moldable material being supplied to the mold box through the open top thereof by a horizontally reciprocable feed pan (not shown). During the molding operation, the open bottom of mold box 12 is closed by an imperforate pallet 13, the pallets being fed automatically by the chains 14 from a pallet stack in the rear of the machine to a position below the mold box and then elevated into engagement with the bottom of the mold by vertically reciprocable anvil bars 15. When the pallet engages the bottom of the mold, the mold box is elevated slightly so that the transversely extending mold side bars 16 which support the other parts of the mold are out of contact with the portions of the machine framework on which they normally rest. The mold box is then ready to receive the charge of moldable material from the feed pan which moves forwardly over the mold and delivers the charge by gravity through the open bottom of the pan. During delivery of the charge, the mold box and superposed feed pan are vibrated by a pair of vibrator assemblies constructed in accordance with the present invention, indicated generally at 17 and hereinafter described in detail, which are connected to the mold side bars 16 adjacent the ends thereof.

When the mold has been filled, the feed pan is moved rearwardly clear of the mold box so as to enable a vertically movable stripping mechanism (not shown) to descend into contact with the upper surface of the material in the mold to first level and compact said material, during which time the mold box is again vibrated and the stripper heads are permitted to gradually sink by gravity as the material is compacted, and to then move downwardly through the mold box and positively eject or strip therefrom the molded blocks 11 as the latter are supported on pallet 13 which is in turn resting on the anvil bars 15. The stripping mechanism ceases its downward movement when the stripper shoes at the lower ends of the stripper heads project slightly below the bottom of the mold box, but the anvil bars 15 continue to descend until the pallet 13 and the blocks 11 supported thereon come to rest on pallet chains 14 which advance the loaded pallet to an unloading position, whence the pallet and blocks may be removed from the machine, either manually or automatically, and transported to the curing vault. As the loaded pallet is moved to the unloading position after the stripping operation, the chains 14 automatically bring another empty pallet into position beneath the mold box, and the anvil bars are again elevated to lift the empty pallet into engagement with the bottom of the mold. Simultaneously with the upward movement of the anvil bars, the stripping mechanism is moved upwardly out of the mold box and returned to its initial position. The vertical movements of the stripping mechanism and anvil bars, and the cooperative horizontal movements of the feed pan, are controlled in known manner by cams.

The details of the mechanism for vibrating the mold box 12 during the charging, compacting and stripping operations are shown best in Figs. 2, 3 and 4. In the form illustrated, each vibrator assembly 17 comprises a front bearing housing 18, a rear bearing housing 19, a front shaft section 20, a rear shaft section 21, a driving sheave 22 which is fixed to the forward end of front shaft section 20 in any suitable manner, as by welding or by the use of a key and set screw connection, and a pair of complementary eccentrically weighted coupling members 23, 23 which are adapted to be connected together by bolts 24 and nuts 25 in clamping relationship with respect to the adjacent ends of shaft sections 20 and 21. The vibration producing element of the assembly, consisting of shaft sections 20 and 21 and the eccentrically weighted coupling formed by members 23, 23, is adapted to be rotated in known manner by an automatically controlled electric motor 26 (Fig. 1) which drives sheave 22 through a plurality of endless belts 27.

Mounted in each of bearing housings 18 and 19 is a self-aligning bearing 28, the front bearing being enclosed by a pair of centrally apertured cap plates 29 removably connected to housing 18 by tap bolts 30, while the closure for the rear bearing is provided by one apertured cap plate 29 and a solid cap plate 31 similarly removably connected to housing 19. Although the self-aligning bearings 28 may be of any suitable construction, it is preferable that their outer races 32 have a light press fit in the bores of housings 18 and 19, and that their inner races 33 be tapered as shown so as to have a force fit on correspondingly tapered split bushings 34 which are adapted to be fixed to shaft sections 20 and 21 by the clamping action of nuts 35 which engage the threaded ends of the tapered bushing halves.

The central portion of each of bearing housings 18 and 19 is provided with an upwardly extending projection 36 which is adapted to engage a correspondingly formed slot 37 in the bottom edge of one of mold side bars 16 so as to key the bearing housing to the mold bar. Each side or wing portion of the housing, which may be narrower than the central portion, is provided with a vertically extending hole 38 adapted to register with a similar hole in mold bar 16 and to receive a bolt 39 for fixing the bearing housing to the mold bar.

Instead of the conventional prior art use of a solid continuous shaft journaled in the front and rear bearings, extending forwardly of the front bearing to receive the driving sheave and carrying a plurality of individually mounted eccentric weights intermediate the bearings, the vibrator assembly of the present invention is characterized by the use of separately formed front and rear shaft sections and an eccentrically weighted coupling which, in the embodiment illustrated, is formed by the complementary members 23, 23.

As shown, each half member 23 is provided with an elongated cylindrical sleeve portion 40, slightly less than half-round in cross section, and a pair of eccentrically weighted end portions 41 formed integrally with sleeve portion 40 with their centers of gravity equally offset from, and lying in the same plane through, the axis of the inner cylindrical surface or bore of sleeve portion 40. One side of each weighted end portion 41 is also hollowed to form a continuation of the cylindrical bore of sleeve portion 40. The radius of the bore in the sleeve and weighted end portions is substantially equal to the radius of shaft sections 20 and 21. As indicated best in Fig. 4, each of end portions 41 is rectangular in end view except for the cylindrically bored side, and the flat surfaces of the latter side lie in the same plane with the two edge surfaces of the sleeve portion 40, which plane is parallel to, but slightly offset from, the axis of the bore. The amount of said offset is such that, when the two complementary members 23, 23 are assembled with shaft sections 20 and 21 in the manner illustrated in Fig. 4, the adjacent plane surfaces of said members are parallel to one another but spaced apart a distance of approximately ⅛ of an inch. In order to maintain the parallelism of said surfaces and permit the desired clamping action with respect to shaft sections 20 and 21 when nuts 25 are tightened up on bolts 24, spacing washers 42 are placed on bolts 24 between the coupling members 23, 23. The clamping action is also facilitated by locating the holes 43 for bolts 24, which extend through the weighted end portions 41 perpendicularly to the plane surfaces of the bored sides thereof, as close as practicable to the bore.

The sleeve portions 40 of coupling members 23 and the front and rear shaft sections 20 and 21 are of such lengths that the same parts may be used to form vibrator assemblies for mold boxes of different standard sizes, as well as molds of the same standard size wherein the spacing between the mold side bars varies slightly. To this end, the lengths of the shaft sections are so selected that, when installed in a mold box of minimum width, the adjacent ends of the shaft sections are substantially in abutment with one another, while the axial length of the sleeve portions of the coupling members is made at least equal to, and preferably somewhat greater than, the difference between the minimum and maximum widths of the mold boxes for which the vibrator assembly is designed.

In the embodiment illustrated, each half coupling member 23 is formed as an integral casting. However, these members may also be constructed by welding conventional vibrator weights to the ends of half-round sections of metal pipe of appropriate diameter, or by machining a full-round, eccentrically weighted coupling out of a solid piece of metal and then splitting the machined piece into complementary halves. It will also be obvious to those skilled in the art that a one-piece weighted coupling member might be used in lieu of the complementary members herein shown by simply splining or keying the shaft sections and the bore of the coupling member for rotation together and providing set screws or equivalent means to control relative movement of the parts in an axial direction.

For installation purposes, it is most convenient to assemble the front and rear bearing housings 18 and 19, bearings 28, front and rear shaft sections 20 and 21, sheave 22 and coupling members 23, 23 as a unit prior to mounting on the mold box. The entire vibrator assembly can then be readily mounted by simply loosening either one or both of the nuts 25 on clamping bolts 24 so as to permit adjustment of the distance between the bearing housings, then securing said housings to the mold side bars 16 by means of the bolts 39, and finally retightening the nuts 25 so as to clamp the complementary coupling members 23, 23 tightly around the adjacent ends of shaft sections 20 and 21. The vibrating mechanism is then ready to operate without further adjustment.

As an alternative method of installation, the front shaft section 20 and sheave 22 may be assembled with the front bearing housing 18 and the associated bearing 28 as one unit, while the rear shaft section 21, rear bearing housing 19 and the enclosed bearing 28 may be similarly assembled as another unit. Each of these two units may then be separately mounted on the mold box by bolting the bearing housing to the mold side bar with the bolts 39. The vibrator assembly can then be readily completed by simply clamping the complementary coupling members 23, 23 together around the adjacent ends of shaft sections 20 and 21 by means of bolts 24, nuts 25 and spacing washers 42.

In operation, motor 26 rotates sheave 22 and front shaft section 20 through the belt drive 27 whenever the motor is energized by the automatic control mechanism of the molding machine. The rotation of front shaft section 20 in turn produces rotation of eccentrically weighted coupling members 23, 23 and rear shaft section 21, with the result that the forces created by the rotating eccentric mass of the coupling are transmitted to the mold box through the bolted connections between bearing housings 18 and 19 and mold side bars 16 and cause the mold to vibrate in the usual manner.

In the event of damage to one of the bearings or one of the shaft sections, the structure disclosed permits repair or replacement of the defective part without removal and disassembly of the entire vibrator unit, because it is only necessary to loosen the nut on one of the clamping bolts of the coupling members and slide the shaft section at the defective end outwardly through its associated bearing housing, leaving the other shaft section in place supporting the coupling members. If desired, a number of assembled shaft sections, bearings and bearing housings can be kept in stock and quickly substituted as units without taking the time to repair a damaged part. It is also possible with the vibrator assembly illustrated to take the mold box apart and repair or replace any part thereof without removing the vibrating means, again by simply loosening the connection between the coupling members and one of the shaft sections.

There is thus provided by the present invention a new and improved vibrating mechanism for the mold boxes of block molding machines and other vibratable bodies which is characterized by its ease of installation, adjustment and maintenance, and by its utility in installations of different sizes. Another feature resides in the fact that the eccentric weights are permanently fixed to the shaft coupling members and cannot change their relative positions, thus insuring uniform and positive vibration at all times. In the event of a broken shaft in a conventional vibrator assembly, replacement is a laborious and time-consuming job. In the structure of the invention, however, the shaft breaking stresses are taken by the coupling members, and in the event of a broken coupling replacement is a simple operation requiring only a few minutes' work.

Another advantage resulting from the use of vibrator assemblies constructed in accordance with the present invention is that there are fewer cases of shearing of the bolts by which the bearing housings are fixed to the mold bars incident to the bending action that takes place in the mold bars upon tightening of the nuts on the stud bolts by which the end liners of the mold are secured to the mold side bars. Shearing of these bolts is a relatively frequent occurrence when using vibrator assemblies of conventional construction, but it has been observed that such damage occurs less frequently with the improved mechanism herein disclosed.

While only one specific form of vibrating mechanism has been illustrated in the accompanying drawings, it will be obvious that the inventive concept is not limited to the particular structure shown, but is capable of a variety of mechanical embodiments. For example, it is evident that the vibrator assemblies of the present invention are adaptable to vibratory bodies other than the mold boxes of block molding machines, as well as to various types of molds other than that shown. It will also be understood that the eccentrically weighted portions of the coupling members may be of any suitable shape and size, and may vary in number dependent upon the requirements of any particular installation. Various other changes, which will now suggest themselves to those skilled in the art, may be made in the form, details of construction and arrangement of the parts without departing from the spirit of the invention. Reference is therefore to be had to the appended claims for a definition of the limits of the invention.

What is claimed is:

1. A mechanism for vibrating a vibratable body comprising a pair of bearing members adapted to be secured to the vibratable body in axially spaced relation, a pair of separately formed shaft sections individually journaled in said bearing members in axial alignment with one another, and a coupling for connecting said shaft sections, said coupling including an eccentrically weighted sleeve portion having a bore for receiving the adjacent ends of said shaft sections, and releasable means for fixing each of said shaft sections to said sleeve portion independently of the other shaft section, said means being operable to release the connection between said coupling and one of said shaft sections without releasing the connection between said coupling and the other shaft section.

2. A mechanism for vibrating a vibratable body comprising a pair of bearing members adapted to be secured to the vibratable body in axially spaced relation, a pair of separately formed shaft sections individually journaled in said bearing members in axial alignment with one another, and means for connecting said shaft sections including a pair of complementary coupling members adapted to embrace the adjacent ends of said shaft sections, each of said coupling members having an elongated eccentrically weighted sleeve portion, and individually releasable means adjacent the ends of said coupling members for clamping the latter to each of said shaft sections independently of the other shaft section, said last-named means being operable to release the connection between said coupling members and one of said shaft sections without releasing the connection between said coupling members and the other shaft section.

3. In a block molding machine of the type embodying a vibratable mold, a vibrating mechanism comprising a pair of bearing members adapted to be detachably secured to laterally spaced elements of the mold, a pair of separately formed shaft sections individually journaled in said bearing members in axial alignment with one another, a coupling connecting the adjacent ends of said shaft sections, and means associated with one of said shaft sections for rotating the interconnected shaft sections and coupling, said coupling including a sleeve portion having a bore into which the adjacent ends of said shaft sections extend, an eccentrically weighted portion integral with said sleeve portion, and releasable means for connecting said sleeve portion to each of said shaft sections independently of the other shaft section, said last-named means being operable to release the connection between said coupling and one of said shaft sections without releasing the connection between said coupling and the other shaft section so as to facilitate installation, replacement, repair or adjustment of said mechanism.

4. In a block molding machine of the type embodying a vibratable mold, a vibrating mechanism comprising a pair of bearing members adapted to be detachably secured to laterally spaced elements of the mold, a pair of separately formed shaft sections individually journaled in said bearing members in axial alignment with one another, a pair of complementary coupling members adapted to embrace the adjacent ends of said shaft sections, means associated with one of said shaft sections for rotating the interconnected shaft sections and coupling members, each of said coupling members having an elongated sleeve portion and a pair of eccentrically weighted portions at the ends of and integral with said sleeve portion, and individually releasable means for clamping said members to each of said shaft sections independently of the other shaft section, said last-named means being operable to release the clamping engagement between said coupling members and one of said shaft sections without releasing the clamping engagement between said members and the other shaft section so as to facilitate installation, replacement, repair or adjustment of said mechanism.

5. An eccentrically weighted coupling for use in a vibrating mechanism of the rotary shaft type embodying a pair of separately formed axially aligned shaft sections, said coupling comprising a pair of complementary members adapted to embrace the adjacent ends of the shaft sections, each of said coupling members having an elongated sleeve portion and a pair of eccentrically weighted portions fixed to the ends of said sleeve portion, and individually releasable means associated with the weighted portions at the opposite ends of said complementary members for connecting said members together in clamping engagement with each of said shaft sections independently of the other shaft section, said means being operable to release the clamping engagement between said complementary members and one of said shaft sections without releasing the clamping engagement between said members and the other shaft section.

6. An eccentrically weighted coupling for use in a vibrating mechanism of the rotary shaft type embodying a pair of separately formed axially aligned shaft sections, said coupling comprising a pair of complementary members each having an elongated sleeve portion with a bore for receiving the adjacent ends of the shaft sections and a pair of eccentrically weighted portions at the ends of and integral with said sleeve portion, and bolts passing through said eccentrically weighted portions for releasably connecting said complementary members together in clamping engagement with each of said shaft sections independently of the other shaft section, said bolts being individually operable to release the clamping engagement between said complementary members and one of said shaft sections without releasing the clamping engagement between said members and the other shaft section.

References Cited in the file of this patent

UNITED STATES PATENTS 1,448,506    Prellwitz _____ Mar. 13, 1923

FOREIGN PATENTS 792,777    France _____ Jan. 10, 1936